United States Patent
Katayama et al.

(10) Patent No.: US 6,907,181 B2
(45) Date of Patent: Jun. 14, 2005

(54) VARIABLE OPTICAL ATTENUATOR

(75) Inventors: Makoto Katayama, Yokohama (JP); Masayuki Nishimura, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 121 days.

(21) Appl. No.: 09/993,410

(22) Filed: Nov. 26, 2001

(65) Prior Publication Data

US 2002/0067906 A1 Jun. 6, 2002

(30) Foreign Application Priority Data

Dec. 1, 2000 (JP) .................................... 2000-366912

(51) Int. Cl.$^7$ .................................................. G02B 6/10
(52) U.S. Cl. .......................... 385/140; 385/3; 385/129; 385/41
(58) Field of Search ................................ 385/140, 129, 385/130, 131, 132, 1–3, 40–42; 356/477, 478, 479, 491

(56) References Cited

U.S. PATENT DOCUMENTS

| | | | | |
|---|---|---|---|---|
| 5,923,798 A | * | 7/1999 | Aksyuk et al. | 385/19 |
| 6,173,105 B1 | * | 1/2001 | Aksyuk et al. | 385/140 |
| 6,222,656 B1 | * | 4/2001 | Eu | 359/127 |
| 6,246,826 B1 | * | 6/2001 | O'Keefe et al. | 385/140 |
| 6,275,320 B1 | * | 8/2001 | Dhuler et al. | 359/237 |
| 6,480,662 B1 | * | 11/2002 | Chai et al. | 385/140 |

FOREIGN PATENT DOCUMENTS

JP 62-183406 8/1987

OTHER PUBLICATIONS

Kawai et al., Variable optical attenuator based on PLC technology for gain control in WDM Society Convention. B–10–61, 1997),
Applied Physics, vol. 60, No. 3, 1991, pp. 228–232.
"Silicon Micromaching High Technology". Science Forum. Mar. 1992.
"Silicon Micromaching and Micro Mechatronics". Beifukan, Jun. 1992.

* cited by examiner

Primary Examiner—Tarifur R. Chowdhury
Assistant Examiner—Michael H Caley
(74) Attorney, Agent, or Firm—McDermott Will & Emery LLP

(57) ABSTRACT

A small optical device which has low power consumption and which is excellent for integration, and which has a variable optical attenuation function which features proper polarization dependence over the entire wide variable optical attenuation range is provided. In the optical device, an optical circuit including a core and a cladding that covers the core is formed on a substrate. An optical element is movably disposed inside a groove provided in the substrate so as to traverse the core, and includes a plurality of optical attenuation elements having different light attenuation amounts. By moving the optical element by an actuation function portion provided on the optical circuit, the attenuation amount of signal light that propagates through the optical circuit is changed.

11 Claims, 11 Drawing Sheets

PRIOR ART

VARIABLE OPTICAL ATTENUATOR

BACKGROUND OF THE INVENTION

1. Field of the Invention

The present invention relates to an optical device which is suitable for use with an optical amplifier or the like in wavelength-division multiplexing (WDM) communication, and which has a variable optical attenuating function or a light-intercepting function.

2. Description of the Related Art

In WDM communication, multiwavelength signal light of a spectrum band of 1.55 µm emitted from a transmitting station is carried through one optical fiber, and is received by a receiving station, whereby high-capacity optical communication is carried out. In order to correctly receive the multiwavelength signal light at the receiving station, the power of the signal light of each wavelength that reaches the receiving station must substantially be the same. To achieve this requires a variable optical attenuator that compensates differences in loss in an optical fiber and in gain obtained by an optical amplifier in an optical transmission line with respect to the wavelengths of the signal light.

A conventional example of a variable optical attenuator is disclosed in Ref. 1 by Kawai et al. (The Inst. of Electronics, Inf. and Commun. Engineers (IEICE) Communication Society Convention, B-10-61, 1997). As shown in FIG. 1, the variable optical attenuator comprises a substrate 1, a Mach-Zehnder interferometer 12, and a heater 9 that is disposed on at least one of the arms of the Mach-Zehnder interferometer 12. The Mach-Zehnder interferometer 12 includes an optical circuit that comprises a core and a cladding that covers the core. The variable optical attenuator controls the amount of optical attenuation by adjusting phase differences between the two arms by thermal phase shifting.

The amount of optical attenuation by the variable optical attenuator is required to be equal to or greater than 35 dB, preferably equal to or greater than 40 dB. In the variable optical attenuator that makes use of a Mach-Zehnder interferometer, in order to increase the amount of optical attenuation to such values, two or more of the Mach-Zehnder interferometers 12, shown in FIG. 1, are connected in series (for example, in Japanese Patent Application Laid-Open No. S6-183406).

Further, in the variable optical attenuator in Ref. 1, the heating portion is only at one side of the core. Since the thermal expansion coefficient of the heater and that of the optical circuit are different, when thermal phase shifting is caused at the optical circuit, birefringence occurs at the same time. This increases polarization dependence of optical attenuation, so that optical performance is considerably reduced. For example, a typical polarization dependent loss (PDL) of a commercially available variable optical attenuator of the type disclosed in Ref. 1 is about 0.3 dB when the amount of optical attenuation is 10 dB, and is about 0.7 dB when the amount of optical attenuation is 15 dB. From the system side, a reduction in PDL to a value equal to or less than 0.2 dB over the entire operating range is expected.

SUMMARY OF THE INVENTION

It is an object of the present invention to provide an optical device whose size, power consumption, insertion loss, and polarization dependence are made smaller, and which has a variable optical attenuating function or a light-intercepting function.

In order to achieve this object, an optical device is provided in which the optical device comprises a substrate; an optical circuit, including a core and a cladding, which is formed on the substrate, the optical circuit which is divided into two portions by a groove that traverses the core such that the core being divided into two core elements; an optical element having an optical attenuating function, the optical element being movably disposed inside the groove at a location between the core elements; and means for actuating said optical element.

According to an optional aspect of the optical device of the present invention, a Mach-Zehnder interferometer having arms is provided at one of optical circuit portions divided by the groove, and at least on one of the arms, there is provided a variable optical attenuation means that varies, by producing a thermal phase shift in a phase difference between the arms, an attenuation amount of signal light that is transmitted through the core elements.

The above and further objects and novel features of the invention will be more fully clarified in the following detailed description when the same is read in connection with the accompanying drawing. It is to be expressly understood, however, that the drawing is for the purpose of illustration only and is not intended as a definition of the limits of the invention.

BRIEF DESCRIPTION OF THE DRAWING

FIGS. 3A and 3B show an embodiment of an optical device of the present invention, in which FIG. 3A is a plan view and FIG. 3B is a sectional view along line IIIB—IIIB shown in FIG. 3A.

FIGS. 5A and 5B show another embodiment of an optical device of the present invention, in which FIG. 5A is a plan view and FIG. 5B is a sectional view taken along line VB—VB shown in FIG. 5A.

FIGS. 6A and 6B show an example of an optical element used in the optical device of the present invention, in which FIG. 6A shows a case where the optical element rotates and FIG. 6B shows a case where the optical element is a lens.

FIGS. 10A and 10B show an optical device of the second example, in which FIG. 10A is a plan view and FIG. 10B is a sectional view taken along line XB—XB shown in FIG. 10A.

FIGS. 11A and 11B show an optical element used in the second example, in which FIG. 11A is a sectional view and FIG. 11B is an end view of the optical element as viewed from a signal-light-incident direction.

DETAILED DESCRIPTION OF THE INVENTION

Figure 1:
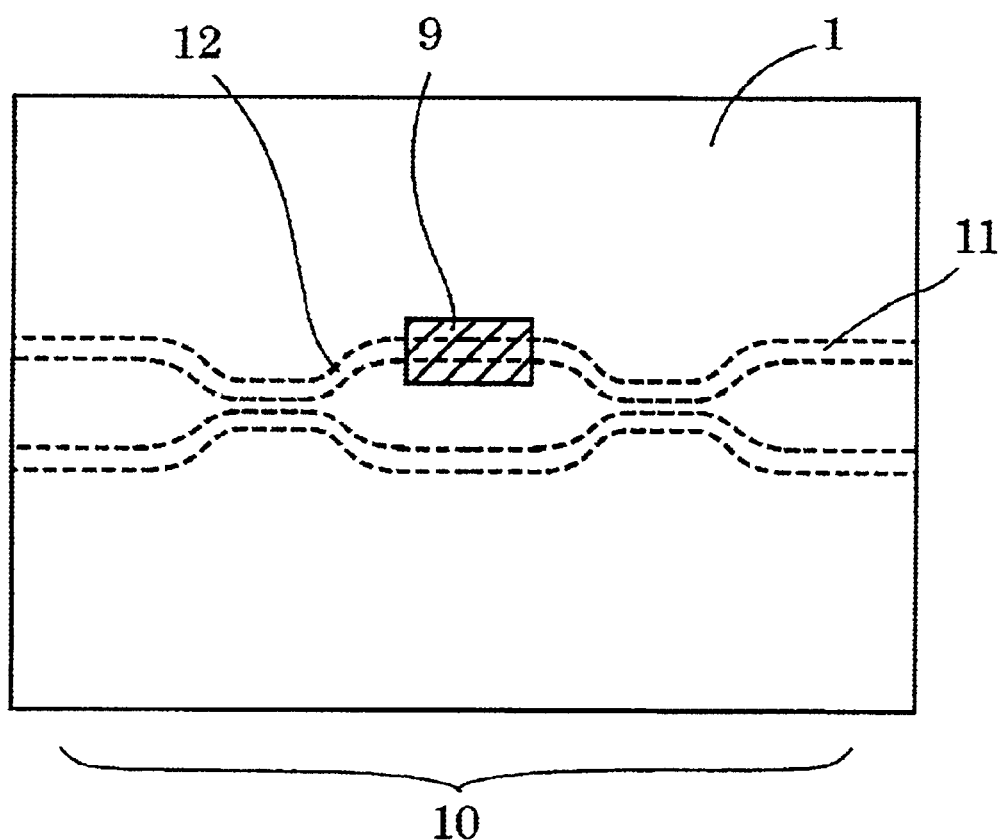
FIG. 1 is a plan view of a conventional variable optical attenuator.
Figure 2:
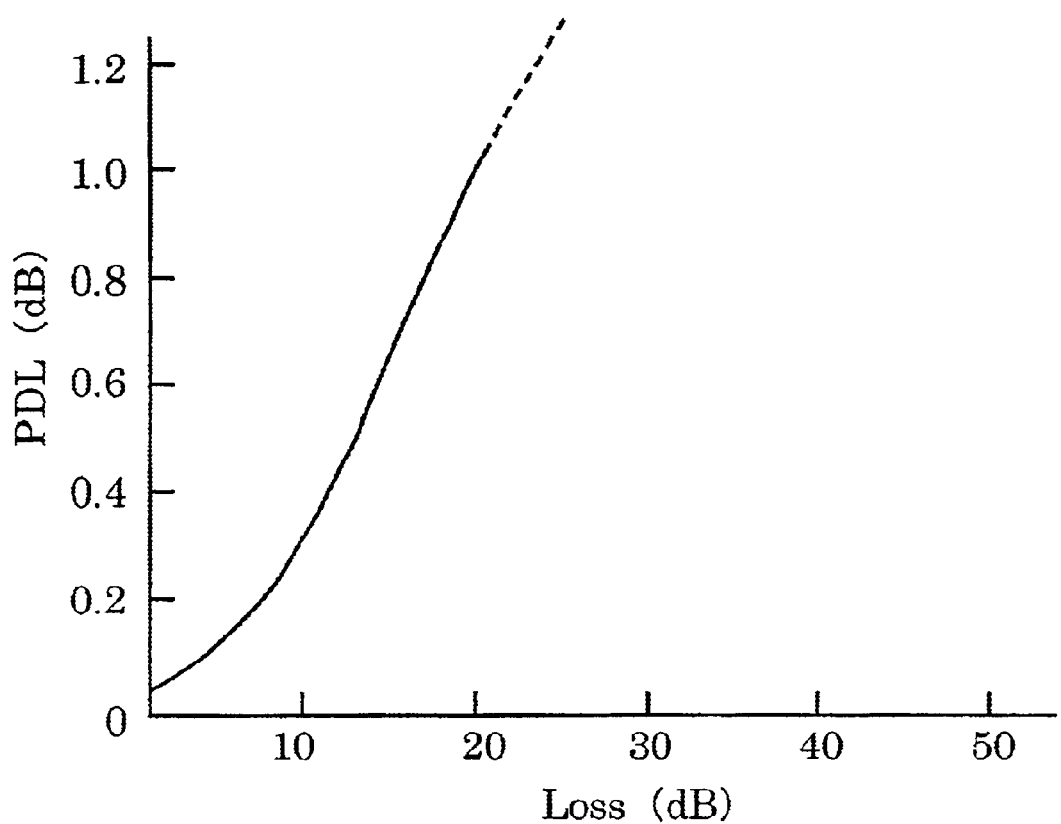
FIG. 2 is a graph showing a typical relationship between the amount of optical attenuation and PDL of the conventional variable optical attenuator.

In the following, preferred embodiments of the present invention will be explained in detail with reference to the accompanying drawings. To facilitate the comprehension of the explanation, the same reference numerals denote the same parts, where possible, throughout the drawings, and a repeated explanation will be omitted. The dimensions in the drawing are partly exaggerated and do not always correspond to actual ratios of dimensions.

Figure 3A:
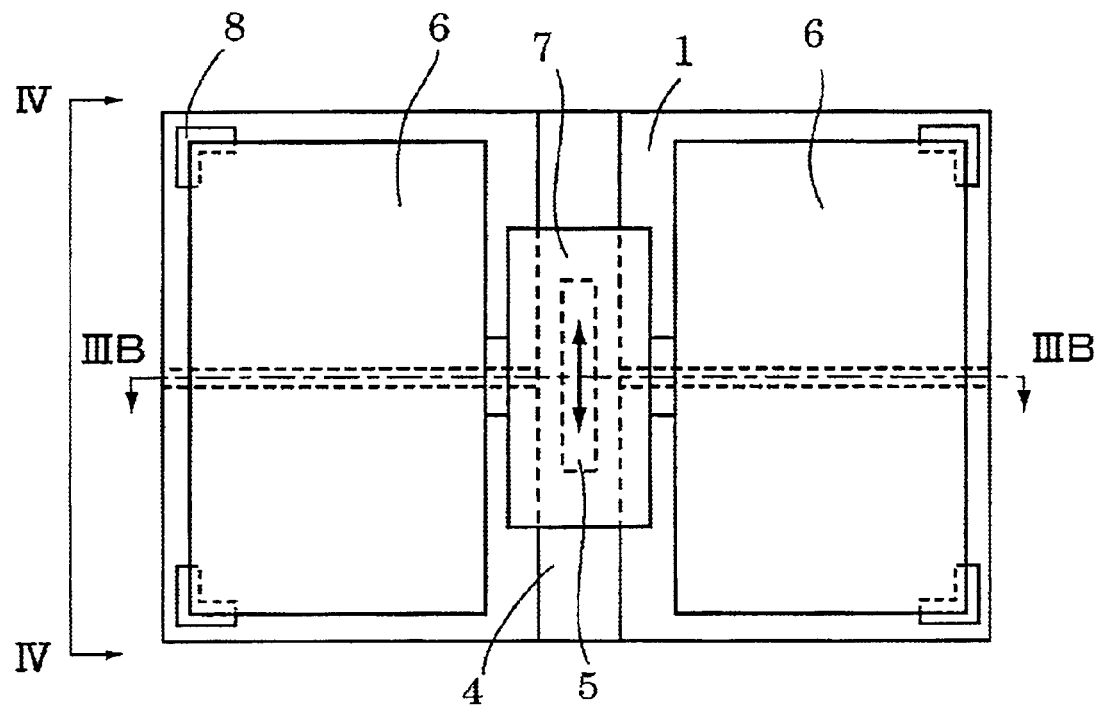
Figure 3B:
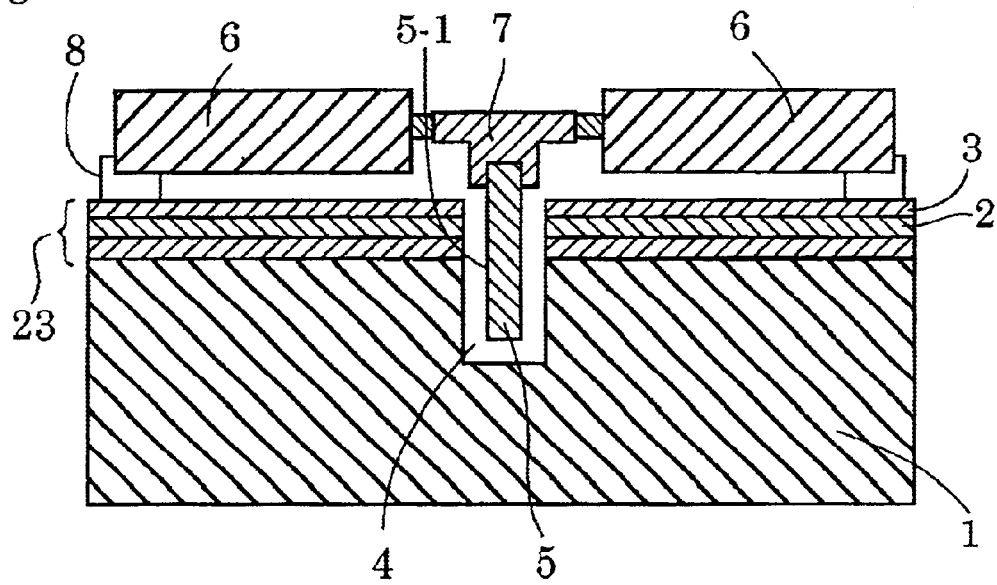

FIGS. 3A and 3B show an embodiment of an optical device of the present invention, in which FIG. 3A is a plan view and FIG. 3B is a sectional view taken along line IIIB—IIIB shown in FIG. 3A. An optical circuit 23 comprising a core 2 and a cladding 3 that covers the core 2 is formed on a substrate 1. A groove 4 which traverses the core 2 is formed across the optical circuit 23. As far as the groove 4 is formed deeper than a region through which signal light is transmitted, it does not matter whether the groove 4 is structured within the depth of the optical circuit 23 or is sufficiently deep to reach the substrate 1. An optical element 5 which has an optical attenuating function and which is connected to an actuation function portion 6 through a supporting portion 7 is placed inside the groove 4 so as to be movable along the groove 4. The actuation function portion 6 is supported at the sides opposite the supporting portion 7 by securing portions 8 disposed on the optical circuit 23.

Figure 4:
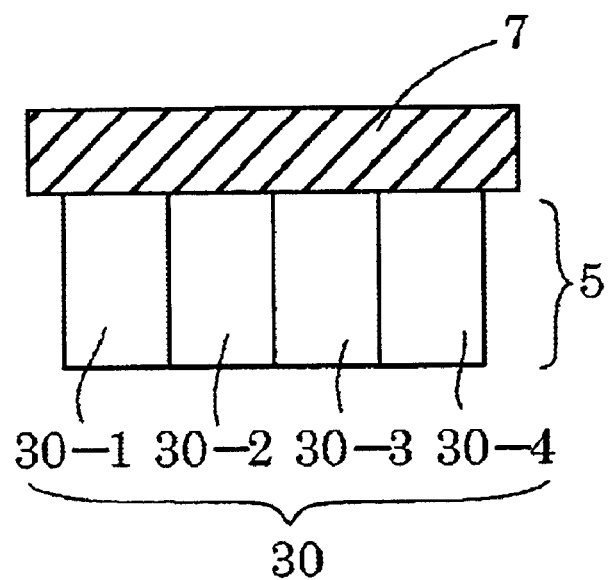
FIG. 4 is an enlarged end view of an optical element taken along line IV—IV shown in FIG. 3A.

FIG. 4 is an enlarged end view of the optical element 5 as viewed from a direction of line IV—IV. An optical attenuation portion 30, in which optical attenuation elements 30-1 to 30-4 are arranged in a row for providing different amounts of optical attenuation, is disposed on a light-receiving surface 5-1 of the optical element 5 on which signal light is incident. The optical attenuation elements 30-1, 30-2, 30-3, and 30-4 provide optical attenuation amounts of approximately 0 dB, 10 dB, 20 dB, and 40 dB, respectively, for the optical circuit 23. By controlling voltage applied to the actuation function portion 6, the side of the actuation function portion 6 adjacent to the supporting portion 7 moves along the groove 4, thereby causing the optical element 5 to move inside the groove 4. In this way, the signal light can be discretely attenuated in accordance with the amount of optical attenuation by the optical attenuation elements 30-1 to 30-4, which are interposed between the core elements of the core 2.

The optical attenuation elements 30-1 to 30-4 are formed of dielectric multi-layer films that absorb or reflect a portion of the signal light, or metallic thin films, such as gold, copper, or nickel films. When the transmittance ratios of the optical attenuation elements 30-1 to 30-4 are 100 to 0.01%, the light attenuation amounts can be 0 dB to 40 dB. When dielectric multi-layer films are used, the transmittance ratios of the optical attenuation elements 30-1 to 30-4 can be adjusted by adjusting film refractive indices, film thicknesses, and the number of layers used. On the other hand, when metallic thin films are used, they can be adjusted by adjusting the materials used, the film thicknesses, and the composition ratios.

The optical element 5 has a side whose length is approximately 10 to a few 100 μm, a thickness of approximately 10 to 100 μm, and a weight equal to or less than a few 100 mg, so that it is very small and light. Therefore, the driving power of the actuation function portion 6 can be made approximately equal to or less than 0.5 W. The amount of time required to move the optical element 5 can be made to be about 1 ms. The optical device can be made small to a size having dimensions of 40 mm in width×40 mm in length or less, which is suitable for integration, and which reduces loss of the optical circuit itself.

In contrast to this, the conventional variable optical attenuator that has a plurality of Mach-Zehnder interferometers connected in series requires an electrical power of 1 W or more and has a response speed of tens of milliseconds, and has dimensions of 40 mm in width×60 mm in length or greater.

Figure 5A:
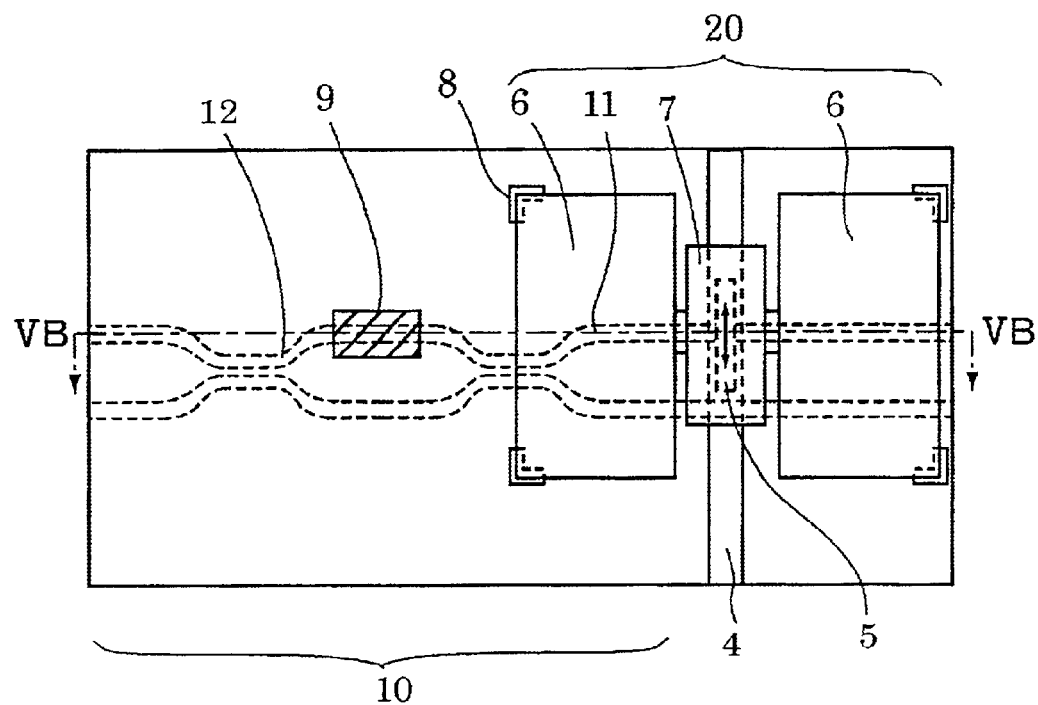
Figure 5B:
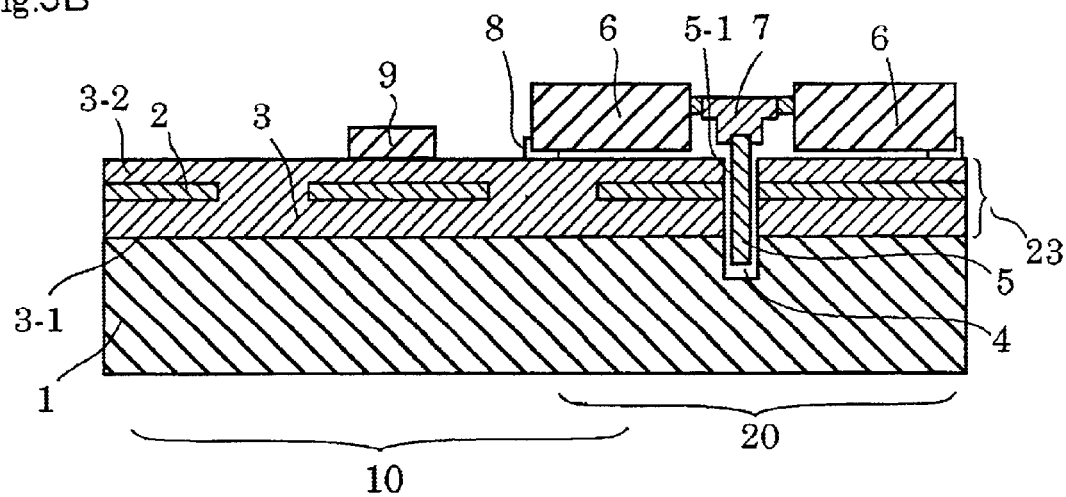

FIGS. 5A and 5B show another embodiment of an optical device of the present invention, in which FIG. 5A is a plan view and FIG. 5B is a sectional view taken along line VB—VB shown in FIG. 5A. The optical device comprises a first optical attenuation portion 10 and a second optical attenuation portion 20, both of which are formed on a substrate 1.

The first optical attenuation portion 10 is a Mach-Zehnder interferometer, and comprises, at at least one of its arms, a variable optical attenuation means, that is, a heater, which changes the amount of attenuation of signal light by producing a thermal phase shift. The second optical attenuation portion 20 comprises a groove 4 that traverses a core of a linear waveguide 11 disposed at an exit side of the first optical attenuation portion 10, an optical element 5 which is held inside the groove 4 and which has a plurality of optical attenuation elements exhibiting discretely differing light attenuation amounts, and an actuation function portion 6 which moves the optical element 5 along the groove 4.

The first optical attenuation portion 10 has a narrow adjustment range, but can continuously adjust the optical attenuation amount. On the other hand, the second optical attenuation portion 20 cannot continuously adjust the optical attenuation amount, but has a wide adjustment range. In a range in which the optical attenuation amount is from 0 to 10 dB or less, the amount of optical attenuation is adjusted only by the first optical attenuation portion 10. In a range in which the optical attenuation amount is from 10 dB to 40 dB or greater, the second optical attenuation portion 20 and the first optical attenuation portion 10 are used in combination for continuous adjustment of the amount of optical attenuation over the entire range.

An optical attenuation element that essentially performs a intercepting operation against signal light may be mounted as a portion of the optical element 5. When this is done, it is possible to realize an optical device which has both an optical attenuating function and a light-intercepting function, which has not been possible with conventional Mach-Zehnder variable optical attenuators. Here, the phrase "essentially performs a intercepting operation against signal light" means that the optical attenuation amount is equal to or greater than 50 dB, so in such a case, only signal light power of a level insufficient for allowing light reception is transmitted.

Figure 6A:
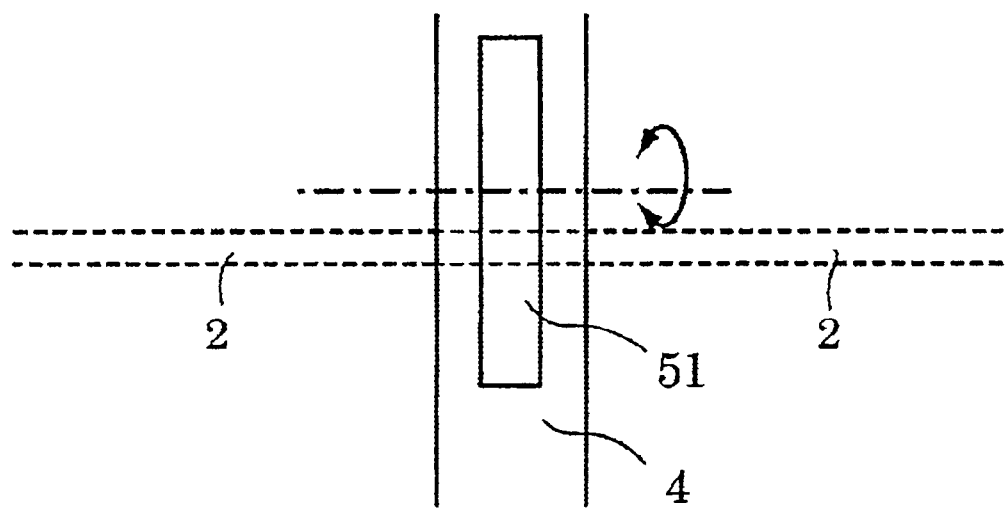
Figure 6B:
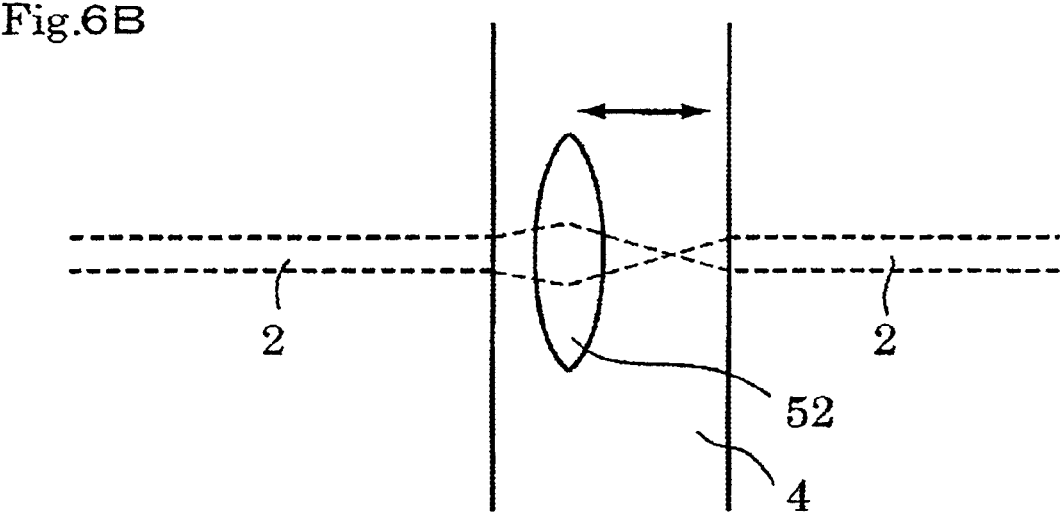

The optical element 5 used in this embodiment may be formed of a dielectric multi-layer film or a metallic thin film as illustrated in FIG. 4, or may be one that makes use of absorption or scattering of signal light. As shown in FIG. 6A, a circular optical element having different optical attenuation amount levels in a radial direction may be used and rotated, or in FIG. 6B, a very small lens 52 may be used and moved in the direction of propagation of light or in a direction perpendicular thereto.

Here, it is important to make the amount of reflected returning light small in an area in which the optical attenuation amount is large. This is because, when the amount of reflected returning light is large, laser oscillation used to transmit signal light becomes unstable, and the S/N ratio of other waveguides becomes small. In order to make the amount of reflected returning light small, a light-receiving surface of the optical element is processed to have a bumpy form by micro-machining, so that reflection and scattering occur in the directions different from a light-incident direction; or the material used for the light-receiving surface may be one having high light absorptivity, so that the reflectivity of the light becomes equal to or less than 20 dB. Suitable materials having high absorptivity include organic materials and ceramic.

EXAMPLE 1

A description of a specific example will be given with reference to FIGS. 5A and 5B. A substrate 1 was made of silicon. After a lower clad layer 3-1 (film thickness: 20 $\mu$m) and a core layer (film thickness: 7 $\mu$m) were formed by depositing silica glass on the silicon substrate, the core layer was subjected to micro-machining to form a core 2. Then, an upper clad layer 3-2 (film thickness: 30 $\mu$m) was formed thereupon by deposition so as to cover the core 2. After a thin chromium film (film thickness: 1 $\mu$m) was formed by vapor-phase deposition, the film was subjected to micro-machining to form a heater which was shaped such as to cover one of the arms of a Mach-Zehnder interferometer, so that a first optical attenuation portion 10 comprising an optical circuit 12 and a heater 9 was formed.

Figure 7:
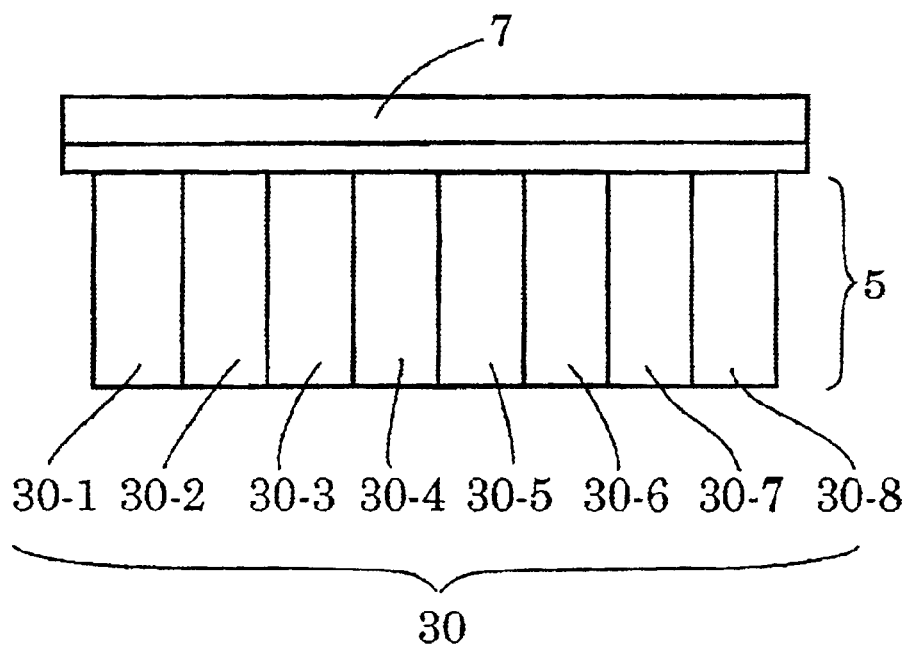
FIG. 7 is an enlarged end view of an optical element used in the first example as viewed from a signal-light-incident direction.

Then, using a dicer, a groove 4 having a width of 50 $\mu$m and a depth of 100 $\mu$m was formed across a linear waveguide 11 at the exit side of the Mach-Zehnder interferometer so as to traverse the core. A small optical element 5 is disposed inside the groove 4. At the same time, an actuation function portion 6, which moves the optical element 5 along the groove 4, was attached to the substrate 1 by securing portions 8, and the actuation portions thereof and the optical element 5 were joined through a supporting portion 7. Optical attenuation elements were mounted to a light-receiving surface 5-1 of the optical element 5 on which signal light is incident. FIG. 7 is an enlarged view of an optical attenuation portion 30. Optical attenuation elements 30-1 to 30-8 having discretely differing optical attenuation functions of approximately 0 dB, 5 dB, 10 dB, 15 dB, 20 dB, 25 dB, 30 dB, and 35 dB were arranged in a row. These optical attenuation elements used in this example were formed of dielectric multi-layer films ($SiO_2$—$TiO_2$ laminated films), and the light attenuation amounts were adjusted by the thicknesses of the multi-layer films and the number of layers used.

Figure 8:
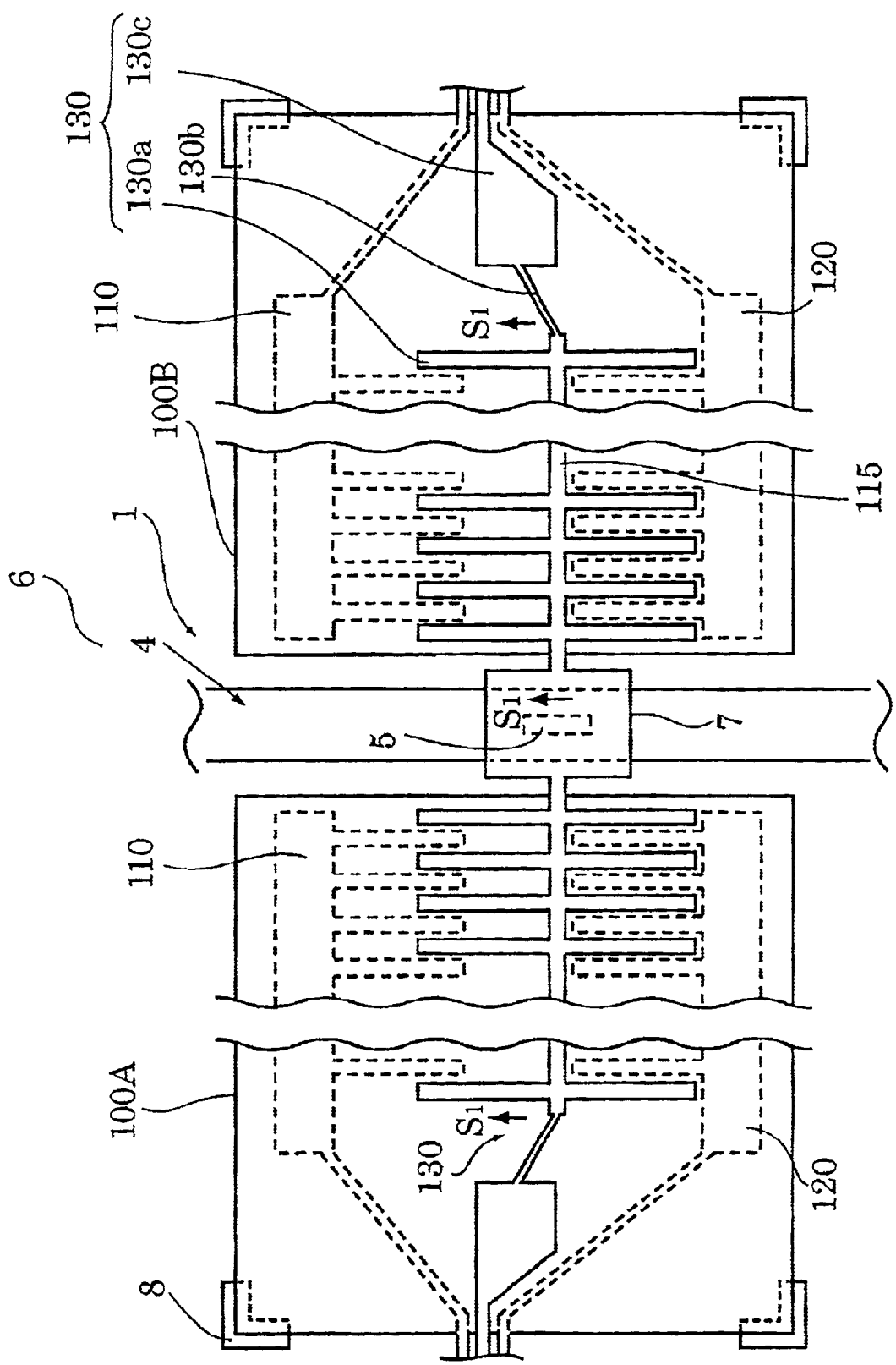
FIG. 8 shows in detail an actuation function portion used in the first example.

FIG. 8 shows in detail an actuation function portion used in Example 1. The actuation function portion 6 comprises actuation portions 100A and 100B, formed on the surface of the substrate 1, with the groove 4 being located therebetween. The actuation portions 100A and 100B each comprise a first comb-shaped electrode 110 and a second comb-shaped electrode 120, provided on the surface of the substrate 1 so as to oppose each other, and a floating part 130, disposed between these corresponding electrodes 110 and 120 and having a portion thereof separated from the substrate 1.

Each floating part 130 comprises a comb-shaped floating electrode 130a, a base 130c which is directly formed on the surface of the substrate 1, and a plate spring 130b. Each plate spring 130b connects the corresponding comb-shaped floating electrode 130a and the corresponding base 130c, and supports the corresponding comb-shaped floating electrode 130a so that it is away from the surface of the substrate 1 by a predetermined distance. Each comb-shaped floating electrode 130a is provided on both sides of a corresponding comb stem 115 which is provided so as to extend from the corresponding plate spring 130b, so that it does not contact adjacent comb teeth of the corresponding first comb-shaped electrode 110 and the corresponding second comb-shaped electrode 120. The supporting portion 7, to which the optical element 5 is attached, is supported by the floating parts 130 of the corresponding actuation portions 100A and 100B so as to cover a portion of the groove 4.

When a voltage is impressed between each first comb-shaped electrode 110 and its corresponding comb-shaped floating electrode 130a, each comb-shaped floating electrode 130a moves in the direction of arrow S1 accordingly as a result of being pulled by electrostatic force by the corresponding first comb-shaped electrode 110. At the same time, the supporting portion 7 and the optical element 5 also move in the direction of arrow S1 corresponding thereto. Similarly, when a voltage is impressed between each second comb-shaped electrode 120 and its corresponding comb-shaped floating electrode 130a, the optical element 5 moves in a direction opposite the direction of arrow S1. In this way, by controlling the voltage applied to each of the first comb-shaped electrodes 110 or to each of the second comb-shaped electrodes 120 and its corresponding comb-shaped floating electrode 130a, it is possible to move the optical element 5 by a predetermined amount along the groove 4.

Here, each floating part 130 was formed by a combination of photolithography and reactive ion etching (RIE). This is disclosed in detail in, for example, Applied Physics (vol. 60, No. 3, 1991, pp. 228 to 232), Silicon Micromachining High Technology (Science Forum, March, 1992), and Silicon Micromachining and Micro Mechatronics (Baifukan, June, 1992).

It is possible to continuously change the optical attenuation function over the entire optical attenuation amount range of 0 dB to 40 dB by interlocking the first optical attenuation portion 10 having an optical attenuation function continuously variable in the range of 0 dB to 5 dB and the second optical actuation portion 20 using an optical element and having an optical attenuation function discretely variable with every 5 dB step in the range of 0 dB to 35 dB.

Figure 9:
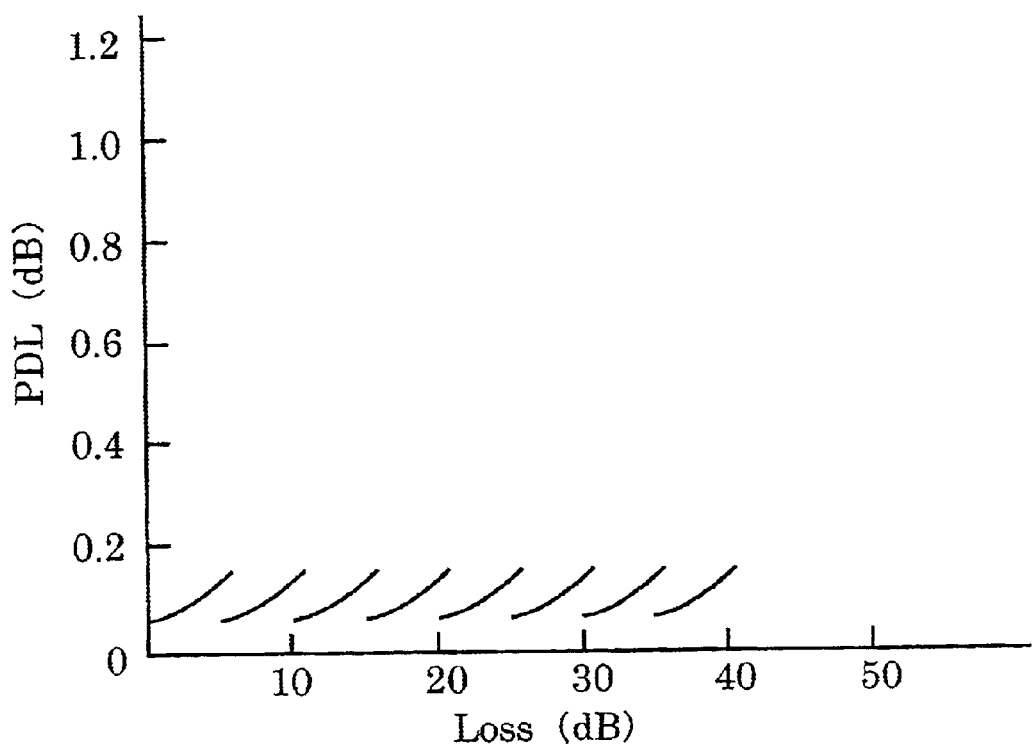
FIG. 9 is a graph showing the relationship between the amount of optical attenuation and PDL of the optical device of the first example.

Data regarding the relationship between the optical attenuation amount and PDL obtained in this example are shown in FIG. 9. Since the birefringence of the optical element itself was small, the optical attenuation amount was of a wide range of from 0 dB to 40 dB, and the PDL range was equal to or less than 0.2 dB, so that excellent performance was achieved.

EXAMPLE 2

Figure 10A:
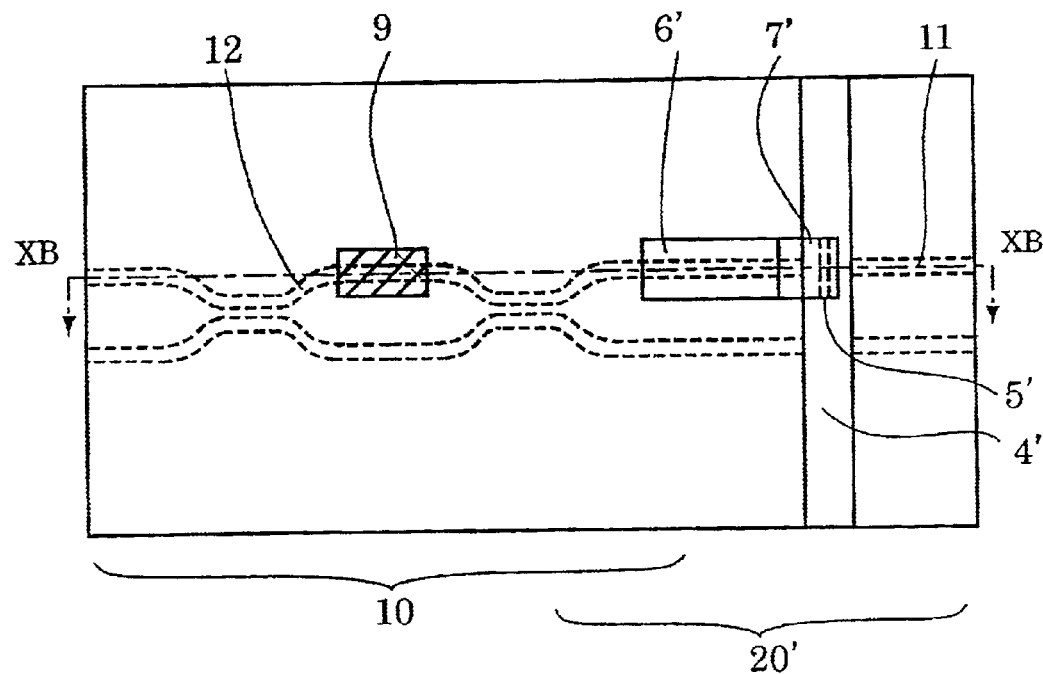
Figure 10B:
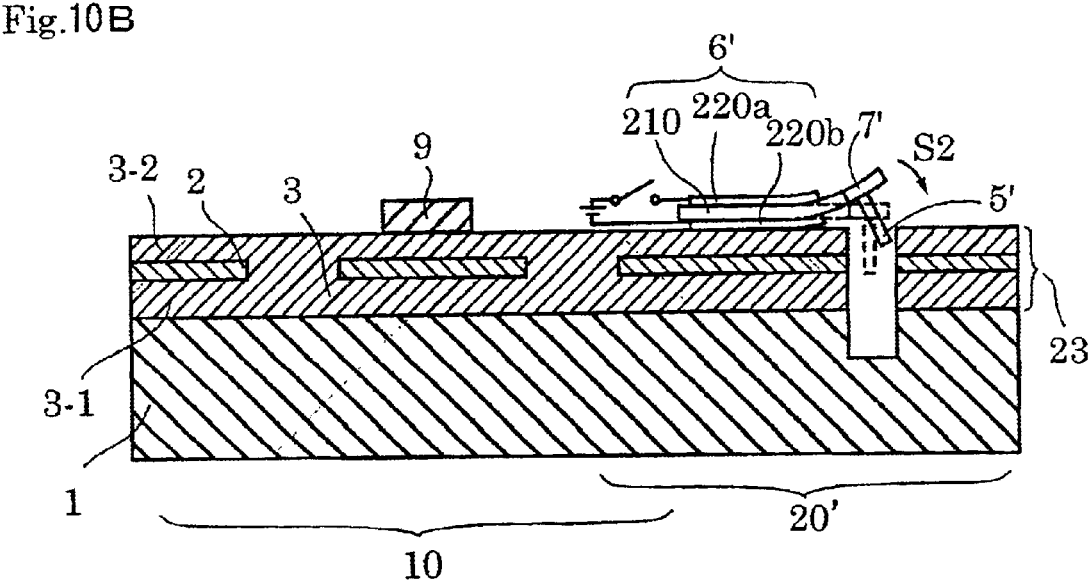

FIGS. 10A and 10B show an optical device of Example 2, in which FIG. 10A is a plan view and FIG. 10B is a sectional view taken along line XB—XB shown in FIG. 10A. As in FIG. 5, a first attenuation portion 10 including a Mach-Zehnder interferometer optical circuit 12 and a heater 9 was formed. Using a dicer, a groove 4' having a width of 80 $\mu$m and a depth of 100 $\mu$m was carved across a linear waveguide 11 at the exit side of the Mach-Zehnder interferometer so as to traverse a core. An actuator function portion 6' was provided near the groove 4, and an optical element 5' having a light-intercepting function was disposed inside the groove 4'.

The optical element 5' was moved into and out of the groove 4' by making use of electrostrictive strain (described later). When an end of the actuation function portion 6' was displaced downward in order to place the optical element 5' inside the groove 4', a intercepting operation was performed by the optical element 5' against signal light. On the other hand, when the end of the actuation function portion 6' was displaced upward in order to place the optical element 5' out of the groove 4', the signal light that had propagated inside the core virtually did not diffract in the groove, but propagated into the opposing core.

Figure 11A:
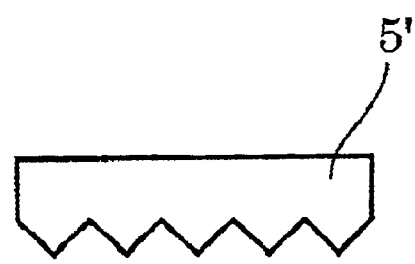
Figure 11B:
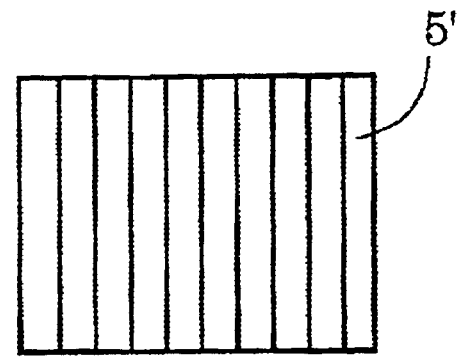

FIGS. 11A and 11B show an optical element used in the second example, in which FIG. 11A is a sectional view and FIG. 11B is an end view of the optical element as viewed from a signal-light-incident direction. The surface of the optical element 5' was processed to have a bumpy form such that a large portion of reflected returning light was prevented from going back to the optical circuit. The optical element 5' was formed by etching the surface of a silicon wafer into a bumpy form, and, then, cutting this into the shape of the optical element 5'.

The actuation function portion 6' includes an insulation layer 210 supporting the optical element 5', and electrodes 220a and 220b, sandwiching the insulation layer 210. When a predetermined voltage was not impressed between the electrodes 220a and 220b, the insulation layer 210 was set in a curved state as shown by the solid line in the drawing so that the optical element 5' was outside the groove 4'. When a predetermined voltage is impressed between the electrodes, the insulation layer 210 moves in the direction of arrow S2 in the drawing such that the optical element 5' is disposed inside the groove 4'. Here, the insulation layer 210 and the electrodes 220a and 220b were fabricated by micromachining polysilicon films and chromium metallic films by using photolithography and etching technologies.

When the optical attenuation amount is to be 0 dB to 10 dB, the optical element 5' is positioned outside the groove 4' in order to adjust the optical attenuation amount by the first optical attenuation portion 10. When a light intercepting operation is to be performed, the optical element 5' is moved into the groove 4' in order to realize a light-intercepting state in which the optical attenuation amount is equal to or greater than 50 dB. In the light intercept state, the reflection attenuation amount is less than −60 dB (lower limit of measurement). Driving power for moving the optical element 5' is 0.3 W. and the response speed is about 0.1 ms.

In the two examples, while the substrates are described as being made of silicon, they may be made of silica glass, compound glass, or alumina or other ceramic materials. In the two examples, while the optical circuits are described as being made of silica glass, they may be formed of semiconductor materials or polymer materials.

Although, in the foregoing description, a structure including one optical-circuit-type variable optical attenuation portion formed at a substrate, and one optical element having an optical attenuating function is described, a structure which uses two or more optical elements arranged in series at one optical-circuit-type variable optical attenuation portion may be used. The place where any of the optical elements is disposed may be at an exit-side optical circuit portion of the optical-circuit-type variable optical attenuation portion or at an entrance-side optical circuit portion thereof. In addition, the optical devices that have been described may be disposed parallel to each other on the same substrate. Such a structure is more suitable for handling multichannel signal light all at once in WDM communication.

What is claimed is:

1. An optical device for giving attenuation amount, comprising:
    a substrate;
    an optical circuit having a core and a cladding, the optical circuit being formed on the substrate and divided into two portions such that the core being divided into two core elements by a groove that traverses the core;
    an optical element having an optical attenuating function, the optical element being movably disposed inside the groove at a location between the core elements; and
    an actuating means, comprising a comb-shaped electrode, for actuating said optical element, wherein one of the optical circuit portions includes a Mach-Zehnder interferometer having arms, and at least one of the arms there is provided a variable optical attenuation means that produces thermal phase shift.

2. An optical device according to claim 1, wherein the optical element has, on its light-receiving surface that receives signal light from the core, optical attenuation elements that exhibit discretely differing optical attenuation amounts.

3. An optical device according to claim 2, wherein one of the optical circuit portions includes a Mach-Zehnder interferometer having arms, and at least at one of the arms there is provided a variable optical attenuation means that produces thermal phase shift, and optical attenuation is made continuously variable over an entire operating range by interpolating a continuous optical attenuation amount, which is produced by thermal phase shift, in a discrete optical attenuation amount, which is produced by moving the optical element along the groove.

4. An optical device according to claim 1, wherein the actuating means comprises:
    a first comb-shaped electrode disposed such that the comb teeth thereof are parallel to the groove;
    a second comb-shaped electrode disposed to oppose the first comb-shaped electrode; and
    a comb-shaped floating electrode disposed between the first and second comb-shaped electrodes, a portion of the floating electrode being away from the surface of the substrate so as to support the optical element.

5. An optical device according to claim 1, wherein the optical attenuating function of the optical element is such as to cause the optical element to essentially perform a intercepting operation against signal light.

6. An optical device according to claim 5, wherein a light-receiving surface of the optical element that receives the signal light has a bumpy form such that the signal light is not reflected in the incident direction.

7. An optical device according to claim 5, wherein reflectivity of a light-receiving surface of the optical element that receives the signal light is equal to or less than 20 dB.

8. An optical device according to any one of the claims 1, 2 and 3 to 7, wherein polarization dependence loss of the optical device is equal to or less than 0.2 dB regardless of the given optical attenuation amount.

9. An optical device according to claim 8, wherein a maximum value of the optical attenuation amount is equal to or greater than 40 dB.

10. An optical device for giving attenuation amount, comprising:
    a substrate;
    an optical circuit having a core and a cladding, the optical circuit being formed on the substrate and divided into two portions such that the core being divided into two core elements by a groove that traverses the core;
    an optical element having an optical attenuating function, the optical element being movably disposed inside the groove at a location between the core elements; and
    an actuating means, comprising a comb-shaped electrode, for actuating said optical element, wherein:
        the optical element has, on its light-receiving surface that receives signal light from the core, optical attenuation elements that exhibit discretely differing optical attenuation amounts; and one of the optical circuit portions includes a Mach-Zehnder interferometer having arms, and at least at one of the arms there is provided a variable optical attenuation means that produces thermal phase shift, and optical attenuation is made continuously variable over an entire operating range by interpolating a continuous optical attenuation amount, which is produced by thermal phase shift, in a discrete optical attenuation amount, which is produced by moving the optical element along the groove.

11. An optical device for giving attenuation amount, comprising:

a substrate;

an optical circuit having a core and a cladding, the optical circuit being formed on the substrate and divided into two portions such that the core being divided into two core elements by a groove that traverses the core;

an optical element having an optical attenuating function, the optical element being movably disposed inside the groove at a location between the core elements; and an actuating means, comprising a comb-shaped electrode, for actuating said optical element, wherein the actuating means comprises:

a first comb-shaped electrode disposed such that the comb teeth thereof are parallel to the groove;

a second comb-shaped electrode disposed to oppose the first comb-shaped electrode; and a comb-shaped floating electrode disposed between the first and second comb-shaped electrodes, a portion of the floating electrode being away from the surface of the substrate so as to support the optical element.

* * * * *